(12) United States Patent
Young et al.

(10) Patent No.: US 7,331,545 B2
(45) Date of Patent: *Feb. 19, 2008

(54) AIRCRAFT ARCHWAY

(75) Inventors: David A. Young, Seattle, WA (US);
Richard Fraker, Edmonds, WA (US);
R. Klaus Brauer, Seattle, WA (US);
Peter S. Guard, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/300,020

(22) Filed: Dec. 14, 2005

(65) Prior Publication Data

US 2006/0102787 A1   May 18, 2006

Related U.S. Application Data

(62) Division of application No. 10/688,624, filed on Oct. 17, 2003, now Pat. No. 7,252,267.

(51) Int. Cl.
*B64D 11/00* (2006.01)

(52) U.S. Cl. .................................... 244/118.5
(58) Field of Classification Search ............. 244/118.5, 244/119; 105/329.1, 331; 52/724.4, 88, 52/89, 86

See application file for complete search history.

(56) References Cited

U.S. PATENT DOCUMENTS

| | | | |
|---|---|---|---|
| 2,111,325 A | 3/1938 | Forbush | |
| 2,111,326 A | 3/1938 | Norris | |
| 2,287,970 A | 3/1942 | Albertine et al. | |
| 2,415,240 A | 2/1947 | Fouhy | |
| 2,877,970 A | 3/1959 | Albertine et al. | |
| 3,154,888 A | 11/1964 | Phillip | |
| 3,330,506 A | 7/1967 | Robillard | |
| 3,404,268 A * | 10/1968 | Fowler | 362/382 |
| 3,405,893 A | 10/1968 | Rajau | |
| 3,445,286 A * | 5/1969 | Knight et al. | 134/32 |
| 4,055,317 A | 10/1977 | Greiss | |
| 4,487,034 A | 12/1984 | Cronin | |
| 4,645,145 A | 2/1987 | Alie | |
| 4,876,828 A * | 10/1989 | Brill | 52/23 |
| 4,911,219 A | 3/1990 | Dalrymple | |
| 5,129,597 A | 7/1992 | Manthey | |
| 5,245,802 A | 9/1993 | Davis | |
| 5,816,534 A | 10/1998 | Schumacher | |

(Continued)

FOREIGN PATENT DOCUMENTS

DE   9406302.8 U1   5/1995

(Continued)

*Primary Examiner*—Tien Dinh
(74) *Attorney, Agent, or Firm*—Ostrager Chong Flaherty & Broitman P.C.

(57) ABSTRACT

An architectural archway for an aircraft. The archways can be positioned individually, or in pairs or other sets along the length of an aircraft fuselage. The archways are used to run or connect various transport elements, such as electrical wiring, water lines, and environmental control system conduits, between the upper crown, lower bay and passenger cabin of the aircraft. The invention simplifies installation complexity and eliminates the installation and variability associated with running transport elements between the various sections of the aircraft.

24 Claims, 4 Drawing Sheets

U.S. PATENT DOCUMENTS

| | | | |
|---|---|---|---|
| 6,007,025 A | 12/1999 | Coughren | |
| 6,082,075 A | 7/2000 | Rysgaard | |
| 6,158,690 A | 12/2000 | Wadey | |
| 6,491,254 B1 * | 12/2002 | Walkinshaw et al. | 244/118.5 |

FOREIGN PATENT DOCUMENTS

| | | |
|---|---|---|
| EP | 0325756 | 8/1989 |
| EP | 0 774 815 | 5/1997 |
| EP | 0867365 | 9/1998 |
| EP | 1106502 | 6/2001 |
| FR | 876942 | 11/1942 |
| FR | 933414 | 4/1948 |
| FR | 2303711 | 8/1976 |
| WO | WO 02/066324 | 8/2002 |
| WO | WO 92/18730 | 10/2002 |

* cited by examiner

AIRCRAFT ARCHWAY

This application is a divisional of U.S. patent application Ser. No. 10/688,624 filed on Oct. 17, 2003 now U.S. Pat. No. 7,252,267.

TECHNICAL FIELD

The present invention relates to architectural structures for aircraft and more particularly to improved structures, cabin furnishing, accessories and auxiliary equipment for aircraft.

BACKGROUND OF THE INVENTION

The interior configuration and architecture of aircraft have become relatively standardized today. The arrangements of the passenger seats, bulkheads, lavatories, serving areas, and crew spaces have been developed for convenience and accommodation of both passengers and crew. The passenger compartments are typically divided into two or more sections with bulkheads and lavatories being positioned accordingly. Aisles and passageway spaces are left between sets of seats and at the access doors.

The support lines and conduits for the accessory and auxiliary systems, such as conditioned air, water, hydraulics and electrical systems, are typically positioned in the lower bay below the passenger compartment (cabin) or in the crown or space above the passenger cabin. For some of these accessory systems, such as conditioned air and electrical systems, the wires and lines are passed between the lower bay and crown, or between one of those areas and the passenger cabins through the sidewalls or support members adjacent the exterior of the aircraft.

The installation, repair, and modification of the accessory and auxiliary systems, as well as the cabin furnishings, is a considerable expense to aircraft owners and users. There is a need for improved interior systems and for more efficient design and use of cabin furnishings and associated systems.

Often, the design and installation of cabin furnishing and auxiliary systems result in modification to the system transport elements, such as electrical wiring, fluid lines, and environmental control system ducts, which result in an increased cost and lead time for delivery of the desired aircraft. The problem is amplified for those transport systems that pass between the crown and lower bay of the aircraft since this may result in the loss of windows and sidewalls or longer than desired runs to fixed monuments at bulkheads.

There is a need in the aircraft industry for improved, more efficient, less complex, and less costly configurations for cabin furnishings and associated auxiliary systems in order to obviate the afore-mentioned problems.

SUMMARY OF THE INVENTION

In accordance with the present invention, one or more arch-type members ("archways") are positioned in the cabin of the aircraft. The archways preferably are inverted generally "U-shaped" structures which extend along the inside surfaces of the passenger cabins and have hollow interiors for placement and passage of electrical wires, air conditioning ducts, water lines and the like. The archways are placed at stable locations within the cabin, such as at fixed door locations, so that they will reduce potential impact on seat configurations. The archways provide a path or raceway for the system transport elements particularly between the crown and lower bays of the aircraft.

The archways also can be positioned at architectural points of interest in the aircraft to help define and establish cabin proportions and also provide logical locations for passage of auxiliary system components. Placement of the archways at door locations provides a passage to run systems at each doorway without interfering with structural intercoastals located between framed bays at the door locations. The archways allow penetration through the floor of the cabin which can be standardized, reducing the variation in floor panel design. In addition, the archways can serve as receptacles for lavatory and gallery monuments, further reducing the complexity associated with integrating those elements into the interior of the aircraft. The archways further can eliminate the need for design close-out seals for outboard monuments.

The present invention simplifies the installation complexity and eliminates the installation variability associated with installing and running transport elements between the crown and lower bays of the aircraft.

DESCRIPTION OF PREFERRED EMBODIMENTS

Figure 1:
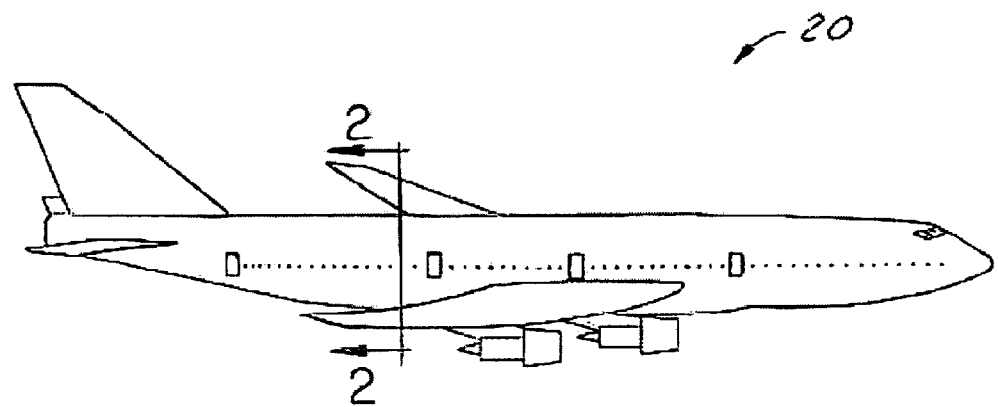
FIG. 1 illustrates an aircraft in which the present invention can be utilized.

Efficient interior configuration and modification of airplanes and other aircraft is of value to airline companies and customers by reducing the costs associated with designing and installing cabin furnishings and auxiliary and support systems. Often, these activities will result in modifications to system transport elements, such as electrical wiring, water lines, or environment control system ducts resulting in increased costs and lead time for delivery of the desired aircraft. This problem is amplified for those transport elements that must run or be passed between the airplane crown and the lower lobe or bay, since current design practices result in loss of windows in the sidewalls, or longer than desired runs to fixed monuments at the fore or aft bulkheads.

The complexity and costs associated with providing for system runs between the crown and lower bays of airplanes and other aircraft has a significant impact on interior architecture, interior flexibility, body structure at doorways and manufacturing installation time. The present invention simplifies the installation complexity and eliminates the installation variability associated with running transport elements between the crown and lower bay areas.

In particular, the present invention uses architectural arches or archways at one or more locations along the length of the aircraft. The archways provide raceways or passageways for system transport elements, particularly for those which need to be passed from the crown to the lower bay of the aircraft. The archways also can be placed at stable locations within the fuselage or cabin of the aircraft, such as at fixed door locations which reduce the potential impact on seat configuration and provide improved cabin configurations.

Archways located on either side of a doorway will enable a number of different functions, such as architectural delineation of cabin volumes that are properly proportioned, and enclosure of system transport elements, including, but not limited to, electrical power and signal, water and conditioned air. The architectural archways also can incorporate a stable floor coupling in order to pass system transporting elements through the floor while meeting existing requirements for floor penetrations.

The inventive archways further will provide accommodation for items, including, but not limited to, system control panels, lavatories, emergency equipment and flight attendant seats. When properly sized and configured, the archways will have the ability to provide for retractable features or otherwise hide these elements within the archway when not in use.

With the present invention, an altered method for interior cabin lighting via recessed task lighting can result, particularly through the use of luminescent cover panels or wash lighting from within the archways. The present invention will also provide a way to more efficiently create and control air temperature zones within the cabin by using an archway located air curtain to prevent air draft from moving fore and aft between cabins.

The present invention further can reduce the impact of external temperature extremes on cabin interior temperatures while in the boarding or deplaning processes.

With the present invention, various stations or zones within the cabin can be designated where passengers can experience a local enhanced air environment contained within a station or zone. This could include local humidification, increased air mixing, or ionized/purified air.

Finally, the present invention can provide a more integrated look for outboard lavatories or gallery monuments by designing the archways to accept the modules without the use of closeout seals or foams. In this regard, system connections servicing these monuments can be readily accessible.

The use of archways located at doorways can serve as a system plenum to connect the systems that run between the crown of the airplane, the lower lobe or bay, and the main passenger cabin. The archways can assist in defining and establishing cabin proportions and also provide logical locations for system runs associated with water, power, and conditioned air. The placement at door locations provides a way to run systems at each doorway without having to interfere with the structural intercoastals located between frame bays typically positioned at door locations.

With the present invention, the penetration through the floor can be standardized which will reduce the variation in floor panel designs.

If the archways are used for lavatory and galley monuments, this can reduce the complexity associated with integrating these elements into the interior, as well as eliminating the need for designed closeout seals for outboard monuments.

FIG. 1 is a perspective view of an airplane or aircraft in which the present invention can be utilized. The airplane is referred to generally by the reference numeral 20.

Figure 2:
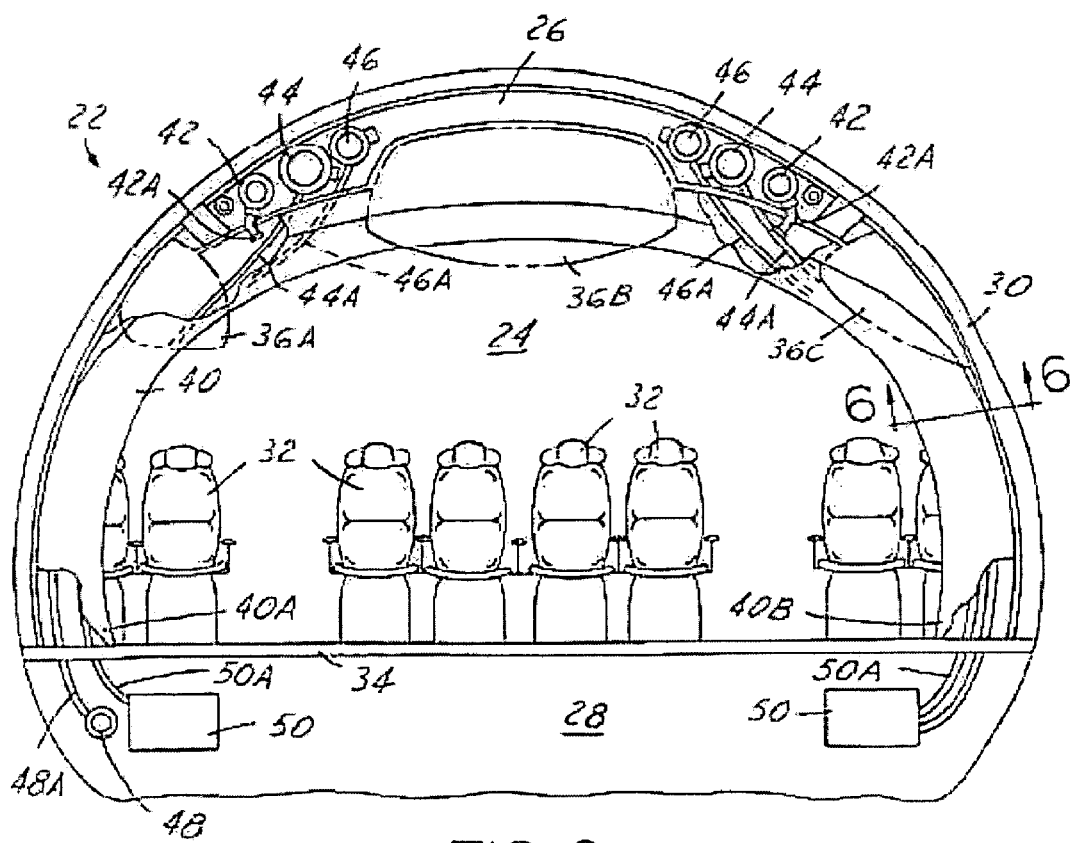
FIG. 2 is a cross-section through the aircraft as shown in FIG. 1 and depicting use of the present invention.

FIG. 2 is a representative cross-section 2-2 taken at a location along the length of the fuselage or cabin of the airplane 20. As indicated, the aircraft includes a main passenger cabin 24, an upper crown area 26 and a lower lobe or bay 28, all positioned with an outer skin or exterior 30 of the airplane. The lower bay 28 typically is utilized for transporting luggage and other material The passenger cabin or compartment 24 includes a number of passenger seats 32 which are positioned on a floor member 34 that extends across the width of the airplane 20. Also, as conventional in airplanes today, a number of luggage or storage bins 36A, 36B, and 36C are provided on the upper portion of the passenger cabin 24.

Figure 6:
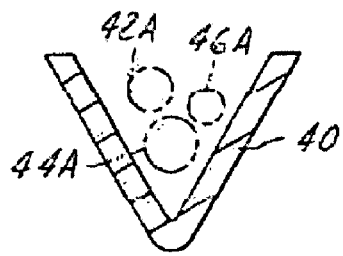
FIG. 6 is a cross-sectional view of the archways as shown in FIG. 2.
Figure 8:
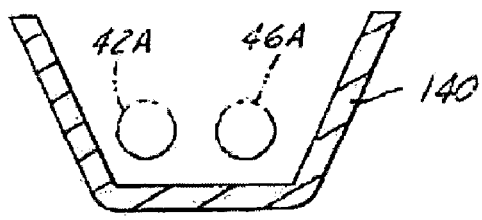
FIG. 8 is a cross-section of still another alternate embodiment of an archway in accordance with the present invention.
Figure 10:
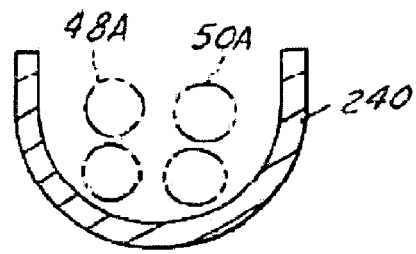
FIG. 10 depicts a cross-section of still another alternate embodiment of an archway in accordance with the present invention.

An architectural arch or archway 40 is shown in its representative position within the airplane 20. The archway has a semi-circular or curved configuration as shown and is attached to the floor member 34 at its two lower ends 40A and 40B. The archway can be attached to the floor member in any conventional manner. The archway 40 preferably has a V-shaped cross-section as shown in FIG. 6. Although a V-shaped cross-section is preferred, it is also possible within the scope of the present invention for the archway 40 to have other cross-sectional sizes and shapes. For example, the archway 140, as shown in FIG. 8, has an expanded U-shaped cross-sectional configuration and shape, while the archway 240 as shown in FIG. 10 has a semi-circular or curved cross-sectional shape and configuration.

As shown in FIG. 2, an aircraft, such as airplane 20, has a number of control, auxiliary and support systems which have wires and conduits which need to be passed or run along the length of the aircraft and to be utilized at various positions along the length of the aircraft. These lines and conduits also need to be passed at some locations between the crown and lower bay areas of the aircraft. The conduits for these systems are shown in FIG. 2 and are represented generally by reference numerals 42, 44, 46, 48, and 50. The conduits and systems mentioned and shown are only representative of the known and conventional systems used in aircraft today, such as electrical wiring, control wiring, water lines, air ducts, environment control system ducts, etc.

With the configuration shown, the system wires and conduits 42, 44, and 46 are positioned in the upper portion or crown 26 of the fuselage of the aircraft. In addition, other systems and conduits, such as 48 and 50 shown in FIG. 2, are positioned in the lower lobe or bay of the aircraft. In order to utilize these systems, the archways 40 of the present invention allow or act as passageways or chaseways for the electrical lines and other conduits, such as 42A, 44A, and 46A, 48A and 50A. As shown in the cross-sectional view in FIG. 6, the conduits are positioned in the interior open space of the archway 40. Some of these same conduits and wires are also shown in FIGS. 8 and 10.

Figure 7:
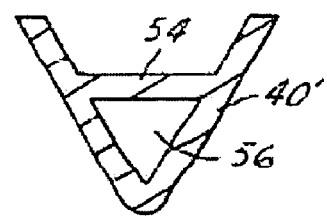
FIG. 7 is a cross-section of an alternate embodiment of an archway in accordance with the present invention.

In accordance with the present invention, it is also possible to have one or more of the conduits or ducts be molded or provided as part of the archway itself. This is shown in FIG. 7, where archway 40' has a cross member 54 which forms an enclosed plenum or chamber 56. It is also to be understood, of course, that any number of interior conduits and plenums can be provided in the archways in accordance with the present invention and thus the invention is not limited to a structure having at least one plenum or any number thereof.

It is to be understood that the various cross-sectional sizes and shapes of the archways 40, 140, and 240 are only illustrative of the various cross-sectional sizes and shapes of archways that can be utilized in accordance with the present invention. Thus, the present invention is not limited to any particular size or shape of cross-section.

It is also possible to provide more than one integral or "built-in" conduit or passageway in the archway. Also, the integral conduits or passageways do not have to extend the full length of the archway, but can be positioned only in one or more portions thereof, such as in the portions which are positioned along the inner sides of the aircraft fuselage. It is further possible to provide one or more archways for the aircraft which are not hollow at all, or are only hollow along portions thereof.

Figure 3:
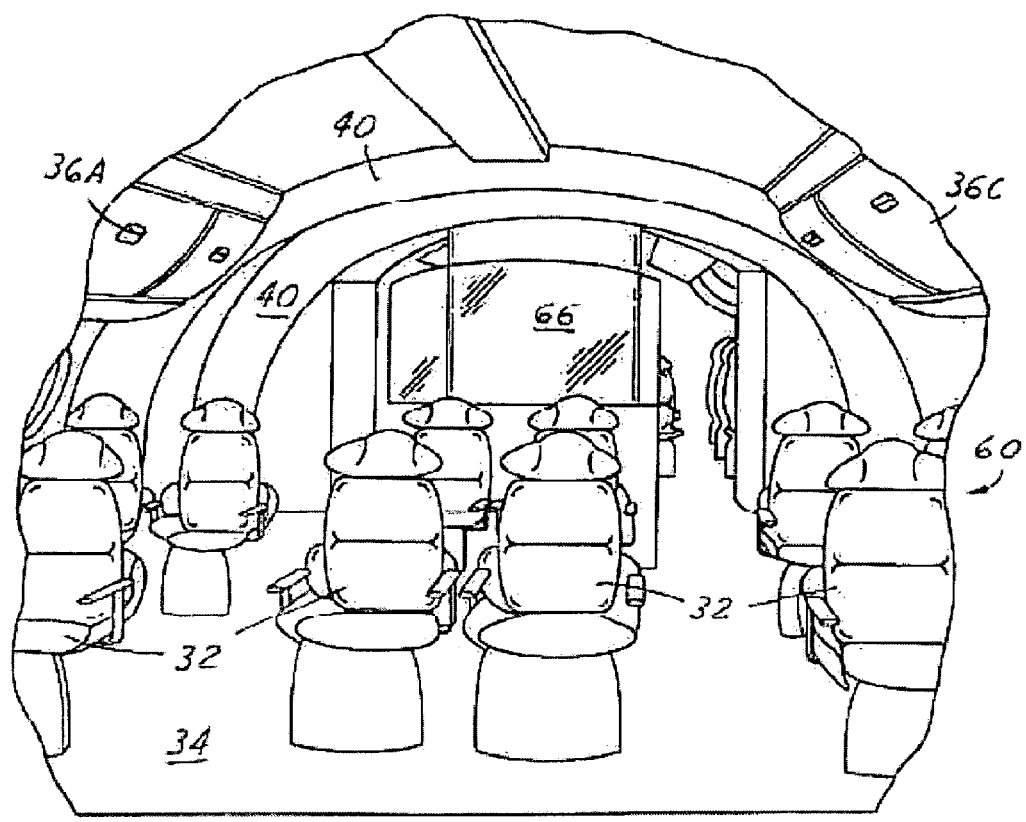
FIG. 3 is a perspective view of an aircraft cabin interior, illustrating the use of the present invention.
Figure 5:
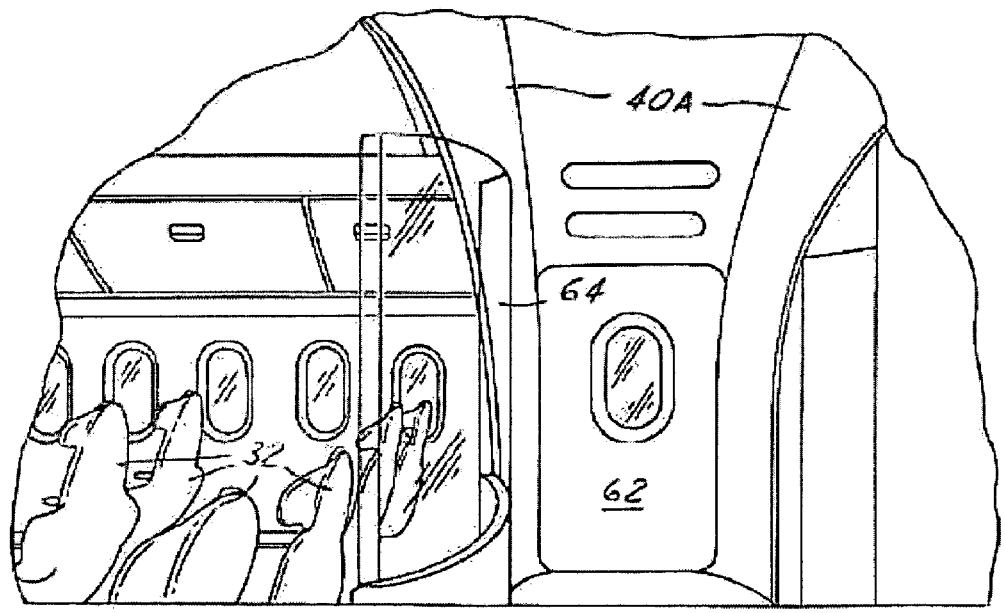
FIG. 5 depicts the use of a pair of inventive archways at an exterior door to the passenger compartment.
Figure 4:
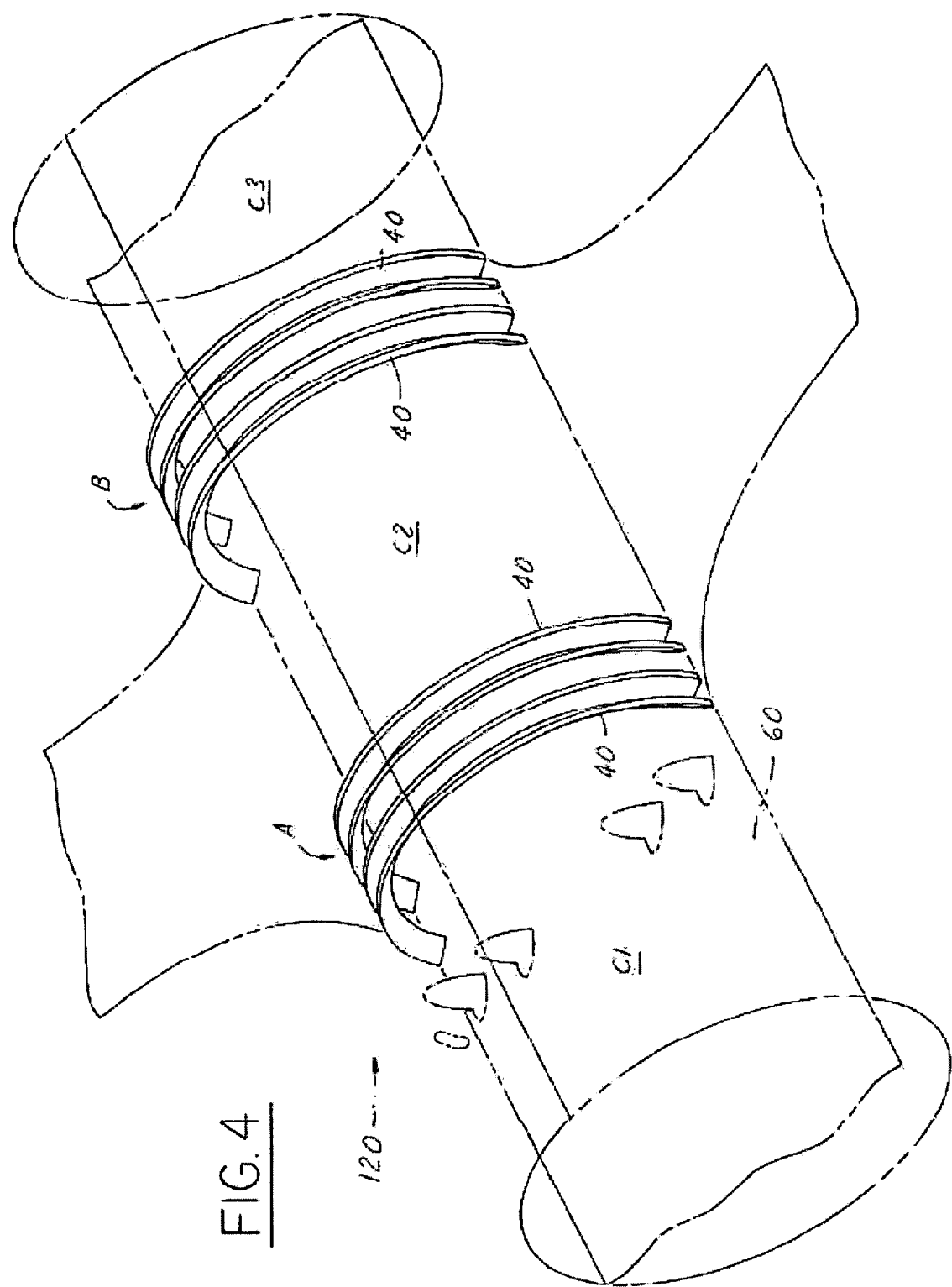
FIG. 4 is a perspective view illustrating the use of a plurality of archways in an aircraft in accordance with the present invention.

In accordance with one embodiment of the present invention, pairs of arches or archways 40 can be positioned at various locations along the length of the aircraft or airplane. This is shown in FIGS. 3-5. First, as shown in FIG. 4, two sets A, B of pairs of archways 40 are shown located at two positions in the fuselage of airplane 120. An interior view of the fuselage 60 in the direction of the length of the fuselage is shown in FIG. 3. The archways 40 are used to separate the fuselage into various cabins C1, C2, and C3 along the length of the airplane.

A side elevational view illustrating one of the pairs of archways 40A is shown in FIG. 5. The pair of archways 40A are also used to frame a door member 62. In this regard, as shown in FIGS. 3 and 5, various petitions 64 and 66 can be positioned in or adjacent to the archways 40, 40A in order to assist in separating the interior cabins, such as C1, C2 and C3, from one another.

It is to be understood in accordance with the present invention, that any number of archways can be provided along the length of the fuselage of an airplane or aircraft. It is also understood that any number of pairs or sets of archways can be provided at various locations along the length of the aircraft.

Figure 9:
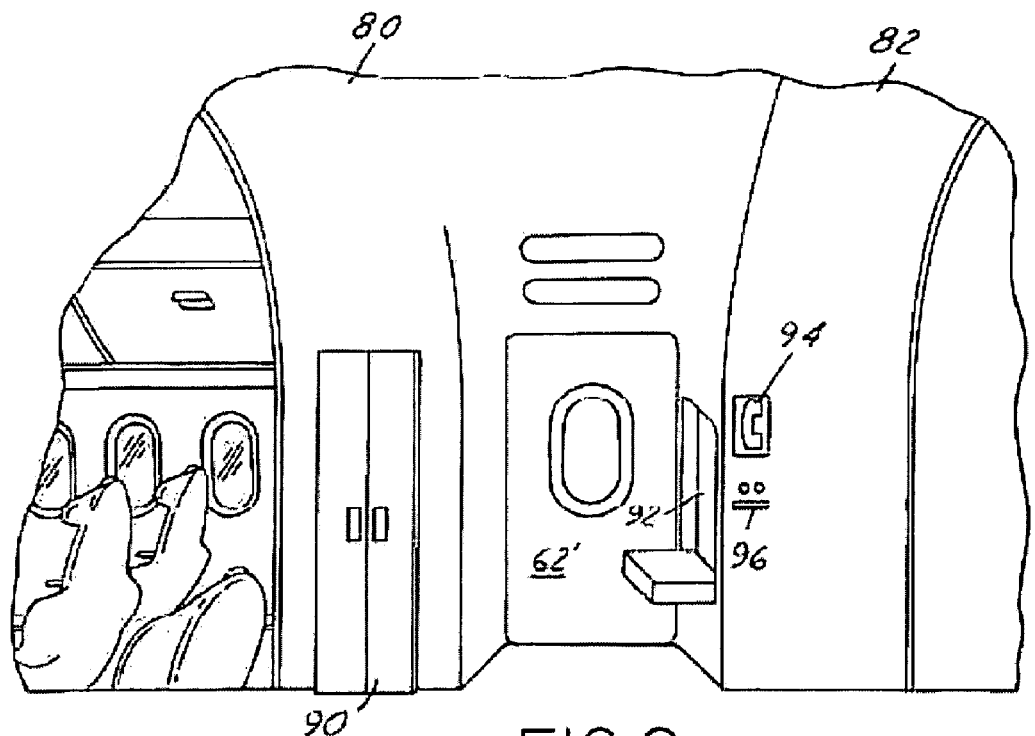
FIG. 9 illustrates use of the present invention for lavatories and other accessory systems.

As shown in FIG. 9, archways in accordance with the present invention can also be used to house or accommodate various accessories or auxiliary systems which are common in passenger airplanes today. In this regard, archways 80 and 82 are used to frame or flank a door member 62' at a location along the length of the airplane. Archway 80 is sufficiently wide to incorporate a lavatory 90, while archway 82 has a size sufficient to incorporate a jump seat 92 for one of the flight attendants. Also, as shown in FIG. 9, an archway can be modified to incorporate various other items and systems, such as telephone 94 and electronic controls 96 for other systems on the airplane.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

What is claimed is:

1. An architectural archway for an aircraft having an elongated fuselage with an upper crown portion, a floor member and a lower lobe portion, said archway comprising an inverted arcuate structure with two spaced apart end members and a flight attendant seat member positioned in said archway structure, said structure adapted to fit inside the fuselage and be positioned on the floor member with said end members positioned on the floor member on opposite sides of the fuselage, wherein said structure is hollow, comprises at least one continuous and uninterrupted passageway, and is adapted to run system components between said upper crown portion and said lower lobe portion through said passageway, the system components comprising electrical wires, water lines and conditioned air ducts.

2. The architectural archway for an aircraft as described in claim 1 wherein said archway has a cross-sectional shape selected from the group of V-shaped, U-shaped and semi-circular shaped.

3. The architectural archway for an aircraft as described in claim 1 further comprising a lavatory positioned in said structure adjacent one of said end members.

4. A pair of architectural archway for an aircraft having an elongated fuselage with a door member, an upper crown portion, a floor member and a lower lobe portion, each of said archways comprising an inverted curved structure with a curved central portion and two spaced apart leg members, each of said leg members having an end member adapted to be positioned on the floor member, said pair of archways adapted to be positioned in the aircraft adjacent to and framing a door member, wherein at least one of said pair of archway structures has a flight attendant seat member in it, wherein said structure is hollow, comprises at least one continuous and uninterrupted passageway, and is adapted to run system components between said upper crown portion and said lower lobe portion through said passageway, the system components comprising electrical wires, water lines and conditioned air ducts.

5. The pair of architectural archways as described in claim 4 wherein said end members of each of said archways are adapted to be positioned on the floor member on opposite sides of the fuselage.

6. The pair of architectural archways as described in claim 4 wherein each of said archways has a cross-sectional shape selected from the group comprising V-shaped, U-shaped and semi-circular shaped.

7. The pair of architectural archways as described in claim 4 wherein at least one of said pair of archway structures has a lavatory in it.

8. An aircraft having a fuselage for carrying passengers, said fuselage having an upper crown portion, a lower lobe portion, a passenger portion, a floor member in said passenger portion, at least one door member in said passenger portion, and at least one conduit from an aircraft support system, comprising at least one archway member positioned in said passenger portion of said fuselage, said archway member having an inverted curved configuration with a curved central portion and two curved end portions, each of said curved end portions having an end member positioned on said floor member and a seat member positioned in at least one curved end portion of said archway member, wherein said archway member has an internal hollow portion comprising at least one continuous and uninterrupted passageway for positioning and passage of said conduit from said aircraft support system through said passageway.

9. The aircraft as described in claim 8 wherein said archway member has a cross-sectional shape selected from the group comprising V-shaped, U-shaped and semi-circular shaped.

10. The aircraft as described in claim 8 wherein said aircraft has a plurality of support system conduits positioned in said crown portion and said lower lobe portion, and wherein at least a portion of said support system conduits are also positioned in said archway member.

11. The aircraft as described in claim 8 wherein said aircraft has a plurality of support system conduits positioned in said crown portion and said lower lobe portion and wherein at least a portion of said support system components are passed between said upper crown portion and said lower lobe portion through said archway member.

12. The aircraft as described in claim 8 wherein a pair of said archway members are positioned closely adjacent each other in said passenger portion and positioned adjacent to said door member.

13. The aircraft as described in claim 12 wherein said pair of archway members are positioned on either side of said door member.

14. The aircraft as described in claim 8 wherein at least two sets of archway members are positioned in said passenger portion, each set comprising a pair of archway members positioned closely adjacent each other.

15. The aircraft as described in claim 8 wherein said archway member is utilized as a divider to separate said passenger portion into two separate sections.

16. The aircraft as described in claim 8 wherein said archway member is utilized as a divider to separate said passenger portion from at least one flight service portion.

17. The aircraft as described in claim 8 further comprising a lavatory positioned in at least one curved end portion of said archway member.

18. The aircraft as described in claim 8 where wherein said aircraft has a plurality of support system conduits positioned in said crown portion and said lower lobe portion, and wherein at least a portion of said support system components are passed from said upper lobe portion and into said passenger portion through said archway member.

19. The aircraft as described in claim 8 wherein said aircraft has a plurality of support system conduits positioned in said crown portion and said lower lobe portion, and wherein at least a portion of said support system components are passed from said lower lobe portion and into said passenger portion through said archway member.

20. The aircraft as described in claim 8 wherein said aircraft has a plurality of support system conduits positioned in said crown portion and said lower lobe portion, and wherein at least a portion of said support system components are passed between said upper crown portion and said lower lobe portion through said archway member.

21. The aircraft as described in claim 8 wherein said support system is at least one member selected from the group of an electrical system, a water system and a conditioned air system.

22. An architectural archway for an aircraft having an elongated fuselage with an upper crown portion, a floor member and a lower lobe portion, said archway comprising an arch-like structure with two spaced apart end members, said structure adapted to fit inside the fuselage and be positioned on the floor member with said end members positioned on the floor member on opposite sides of the fuselage, and a flight attendant seat member positioned in said archway structure, wherein said archway is hollow, comprises at least one continuous and uninterrupted passageway, and is adapted to run system components between said upper crown portion and said lower lobe portion through said passageway, the system components comprising electrical wires, water lines and conditioned air ducts.

23. The architectural archway for an aircraft as described in claim 22 wherein said archway has a cross-sectional shape selected from the group comprising V-shaped, U-shaped and semi-circular shaped.

24. The architectural archway for an aircraft as described in claim 22 further comprising a lavatory positioned in said archway structure adjacent one of said end members.

* * * * *